US011172545B2

(12) United States Patent
Huang et al.

(10) Patent No.: US 11,172,545 B2
(45) Date of Patent: Nov. 9, 2021

(54) DATA TRANSMISSION METHOD, APPARATUS, AND SYSTEM

(71) Applicant: HUAWEI TECHNOLOGIES CO., LTD., Guangdong (CN)

(72) Inventors: Zhenglei Huang, Beijing (CN); Jiangwei Ying, Beijing (CN); Shiyong Tan, Beijing (CN); Bo Lin, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 4 days.

(21) Appl. No.: 16/742,393

(22) Filed: Jan. 14, 2020

(65) Prior Publication Data
US 2020/0154520 A1    May 14, 2020

Related U.S. Application Data

(63) Continuation of application No. PCT/CN2018/094702, filed on Jul. 5, 2018.

(30) Foreign Application Priority Data

Jul. 14, 2017    (CN) .......................... 201710576557.3

(51) Int. Cl.
H04W 12/04    (2021.01)
H04W 12/06    (2021.01)
(Continued)

(52) U.S. Cl.
CPC ........... *H04W 88/085* (2013.01); *H04W 4/14* (2013.01); *H04W 12/06* (2013.01);
(Continued)

(58) Field of Classification Search
CPC ..... H04W 88/085; H04W 76/25; H04W 4/14; H04W 12/06; H04W 52/0206;
(Continued)

(56) References Cited

U.S. PATENT DOCUMENTS

2016/0088668 A1    3/2016    Kim et al.
2016/0135242 A1    5/2016    Hampel et al.
(Continued)

FOREIGN PATENT DOCUMENTS

CN    105848083 A         8/2016
CN    106028427    *    10/2016    ............ H04W 52/02
(Continued)

OTHER PUBLICATIONS

ZTE,Discussions on D2D UE-to-network Relay,R1-151725 3GPP TSG-RAN WG1 Meeting #80bis Belgrade, Serbia, Apr. 20-24, 2015 (Year: 2015).*

(Continued)

*Primary Examiner* — Inder P Mehra
(74) *Attorney, Agent, or Firm* — Womble Bond Dickinson (US) LLP

(57) ABSTRACT

Embodiments of the present disclosure disclose a method, an apparatus, and a system for data transmission. The method includes: broadcasting, by a relay device, a first message, where the first message is used to indicate that the relay device supports data forwarding; receiving, by the relay device, a second message from a remote device, where the second message includes data of the remote device; and sending, by the relay device, the data to a core network device based on the second message. In the present method, after receiving the first message broadcast by the relay device, the remote device directly sends the data of the remote device to the relay device without establishing a connection dedicated for transmitting the data of the remote device between the remote device and the relay device, thereby reducing signaling and reducing power consumption of the remote device.

8 Claims, 9 Drawing Sheets

(51) Int. Cl.
*H04W 12/08* (2021.01)
*H04W 52/02* (2009.01)
*H04W 88/04* (2009.01)
*H04W 76/25* (2018.01)
*H04W 88/08* (2009.01)
*H04W 4/14* (2009.01)
*H04W 88/18* (2009.01)

(52) U.S. Cl.
CPC ....... *H04W 52/0206* (2013.01); *H04W 76/25* (2018.02); *H04W 88/184* (2013.01)

(58) Field of Classification Search
CPC ..... H04W 88/184; H04W 4/70; H04W 8/005; H04W 88/04; H04W 12/04; H04W 12/08; H04W 52/02; H04W 4/06; H04W 52/0209; Y02D 30/70
USPC ......................................................... 370/329
See application file for complete search history.

(56) References Cited

U.S. PATENT DOCUMENTS

| | | | | |
|---|---|---|---|---|
| 2017/0070362 | A1* | 3/2017 | Tappeiner | G06Q 30/0283 |
| 2017/0164332 | A1* | 6/2017 | Kim | H04W 40/246 |
| 2018/0234942 | A1* | 8/2018 | Kim | H04L 61/2015 |
| 2019/0215691 | A1* | 7/2019 | Salkintzis | H04W 12/069 |
| 2019/0215762 | A1* | 7/2019 | Kim | H04W 76/27 |
| 2020/0053802 | A1* | 2/2020 | Li | H04L 41/5077 |
| 2020/0187152 | A1* | 6/2020 | Karampatsis | H04W 68/00 |

FOREIGN PATENT DOCUMENTS

| | | |
|---|---|---|
| CN | 106028427 A | 10/2016 |
| CN | 106162803 A | 11/2016 |
| CN | 106470420 A | 3/2017 |
| CN | 106793154 A | 5/2017 |
| WO | 2016077014 A1 | 5/2016 |
| WO | 2017028294 A1 | 2/2017 |

OTHER PUBLICATIONS

Kyocera,"Consideration of establishment of ProSe UE-to-Network Relays", 3GPP TSG-RAN WG2 #90, R2-152600, Fukuoka, Japan, May 25-29, 2015, total 6 pages.

ZTE,"Discussions on D2D UE-to-network Relay",3GPP TSG-RAN WG1 Meeting #80bis,R1-151725,Belgrade, Serbia, Apr. 20-24, 2015, total 6 pages.

* cited by examiner

DATA TRANSMISSION METHOD, APPARATUS, AND SYSTEM

CROSS-REFERENCE TO RELATED APPLICATIONS

This application is a continuation of International Application No. PCT/CN2018/094702, filed on Jul. 5, 2018, which claims priority to Chinese Patent Application No. 201710576557.3, filed on Jul. 14, 2017, The disclosures of the aforementioned applications are hereby incorporated by reference in their entireties.

TECHNICAL FIELD

The present disclosure relates to a communications system, and in particular, to a data transmission method, an apparatus, and a system.

BACKGROUND

With rapid development of the Internet of Things, it is expected that one trillion Internet of Things (IoT) devices will be connected to communications systems around 2030. This raises higher requirements on both the communications systems and the IoT devices. Particularly, for IoT devices such as sensors, low costs and low power consumption are indispensable. Usually, an IoT device is deployed in an area with relatively poor signal coverage, for example, in a basement or an office building, and data transmission between the IoT device and a communications network can be implemented by using a relay device. In this case, the IoT device may also be referred to as a remote device.

Due to a small size and a limited power capacity, the IoT device needs to have a feature of low power consumption. In addition, there are a large quantity of IoT devices, and battery replacement or power supply maintenance may increase costs. Usually, battery replacement does not occur during a lifecycle of the IoT device. Therefore, how to reduce power consumption of an IoT device to prolong a lifecycle of the IoT device is a problem that urgently needs to be solved.

SUMMARY

Embodiments of the present disclosure provide a data transmission method, an apparatus, and a system, so that power consumption of a remote device can be further reduced, and a lifecycle of the remote device can be prolonged.

According to a first aspect, a data transmission method is provided, including: broadcasting, by a relay device, a first message, where the first message is used to indicate that the relay device supports data forwarding; receiving, by the relay device, a second message from a remote device, where the second message includes data of the remote device; and sending, by the relay device, the data to a core network device based on the second message. In the method, the data of the remote device is sent in response to a broadcast message without establishing a dedicated connection between the relay device and the remote device, thus reducing power consumption of the remote device and further prolonging a lifecycle of the remote device.

In one embodiment, the second message further includes at least one of an authentication parameter and an identity of the remote device.

In one embodiment, the second message further includes the authentication parameter; and the sending, by the relay device, the data to a core network device based on the second message includes: performing, by the relay device, authentication on the remote device based on the authentication parameter; and sending, by the relay device, the data to the core network device when the remote device is authenticated successfully. Validity of the remote device is checked through the authentication parameter, to provide security of a communications network.

In one embodiment, the sending the data to a core network device includes: sending, by the relay device, a non-access stratum NAS message to the core network device, where the NAS message includes the data and relay indication information, and the relay indication information is used to indicate that the data is forwarded data.

In one embodiment, the second message includes a short message service SMS message, and the SMS message includes the data and the identity of the remote device; and the sending the data to a core network device includes: sending, by the relay device, a NAS message to the core network device, where the NAS message includes the SMS message.

In one embodiment, the second message further includes the identity of the remote device, and the sending the data to a core network device includes:

generating, by the relay device, an SMS message, where the SMS message includes the data and the identity of the remote device; and sending, by the relay device, the SMS message to the core network device.

The foregoing embodiments provide different manners in which the relay device forwards the data of the remote device, and two manners may both exist, so that flexibility of the solution is improved.

According to a second aspect, a data transmission method is provided, including: monitoring, by a remote device, a first message broadcast by a relay device, where the first message is used to indicate that the relay device supports data forwarding; and sending, by the remote device, a second message to the relay device, where the second message includes data of the remote device.

In one embodiment, the second message further includes at least one of an authentication parameter and an identity of the remote device. The authentication parameter is used to check validity of the remote device, to ensure security of a network.

According to a third aspect, a data transmission method is provided, including: receiving, by a core network device, a NAS message from a relay device, where the NAS message includes data of a remote device and relay indication information, and the relay indication information is used to indicate that the data is forwarded data; and sending, by the core network device, the data based on the relay indication information. The core network device identifies the data of the remote device based on the relay indication information, to further send the data to a corresponding device, so that the data of the remote device can be transmitted correctly.

In one embodiment, the relay indication information includes a type of the data; and the sending, by the core network device, the data based on the relay indication information includes: sending, by the core network device, the data to an application server AS corresponding to the type based on the type of the data. In the manner, the data of the remote device is sent to the corresponding AS.

In one embodiment, the sending, by the core network device, the data based on the relay indication information includes: sending, by the core network device, the data to a connection management platform.

In one embodiment, the NAS message further includes a number of the data and an identity of the remote device, and the method further includes: performing, by the core network device, deduplication on received data of the remote device based on the number of the data and the identity of the remote device. In the manner, data deduplication of the remote device is implemented, thereby ensuring correct transmission of remote data.

According to a fourth aspect, a data transmission method is provided, including: generating, by a remote device, a broadcast message, where the broadcast message includes data of the remote device and an identity of the remote device; and broadcasting, by the remote device, the broadcast message. The remote device directly sends the data of the remote device through the broadcast message, to save signaling and reduce power consumption of the remote device, thereby prolonging a lifecycle of the remote device.

In one embodiment, the broadcast message further includes an authentication parameter. The authentication parameter is used to check validity of the remote device, to ensure security of a network.

According to a fifth aspect, a data transmission method is provided, including: monitoring, by a relay device, a first broadcast message, where the first broadcast message includes data of a remote device and an identity of the remote device; and sending, by the relay device, the data to a core network device.

In one embodiment, the method further includes: broadcasting, by the relay device, a second broadcast message, where the second broadcast message includes the identity of the remote device, and the second broadcast message is used to indicate that the data of the remote device is forwarded by the relay device. In the manner, another relay device is prevented from sending the data of the remote device, thereby saving air interface resource overheads.

According to a sixth aspect, a relay device is provided, including a unit or means configured to perform each operation of any method according to the foregoing first aspect.

According to a seventh aspect, a relay device is provided, including a processor and a memory, where the memory is configured to store a program, and the processor invokes the program stored in the memory, to perform any method according to the foregoing first aspect.

According to an eighth aspect, a relay device is provided, including at least one processing element or chip configured to perform any method according to the foregoing first aspect.

According to a ninth aspect, a program is provided. When being executed by a processor, the program is configured to perform any method according to the foregoing first aspect.

According to a tenth aspect, a computer-readable storage medium is provided, including the program according to the ninth aspect.

According to an eleventh aspect, a remote device is provided, including a unit or means configured to perform each operation of any method according to the foregoing second aspect.

According to a twelfth aspect, a remote device is provided, including a processor and a memory, where the memory is configured to store a program, and the processor invokes the program stored in the memory, to perform any method according to the foregoing second aspect.

According to a thirteenth aspect, a remote device is provided, including at least one processing element or chip configured to perform any method according to the foregoing second aspect.

According to a fourteenth aspect, a program is provided. When being executed by a processor, the program is configured to perform any method according to the foregoing second aspect.

According to a fifteenth aspect, a computer-readable storage medium is provided, including the program according to the fourteenth aspect.

According to a sixteenth aspect, a core network device is provided, including a unit or means configured to perform each operation of any method according to the foregoing third aspect.

According to a seventeenth aspect, a core network device is provided, including a processor and a memory, where the memory is configured to store a program, and the processor invokes the program stored in the memory, to perform any method according to the foregoing third aspect.

According to an eighteenth aspect, a core network device is provided, including at least one processing element or chip configured to perform any method according to the foregoing third aspect.

According to a nineteenth aspect, a program is provided. When being executed by a processor, the program is configured to perform any method according to the foregoing third aspect.

According to a twentieth aspect, a computer-readable storage medium is provided, including the program according to the nineteenth aspect.

According to a twenty-first aspect, a remote device is provided, including a unit or means configured to perform the foregoing fourth aspect or each operation of any method according to the fourth aspect.

According to a twenty-second aspect, a remote device is provided, including a processor and a memory, where the memory is configured to store a program, and the processor invokes the program stored in the memory, to perform the foregoing fourth aspect or any method according to the fourth aspect.

According to a twenty-third aspect, a remote device is provided, including at least one processing element or chip configured to perform the foregoing fourth aspect or any method according to the fourth aspect.

According to a twenty-fourth aspect, a program is provided. When being executed by a processor, the program is configured to perform the foregoing fourth aspect or any method according to the fourth aspect.

According to a twenty-fifth aspect, a computer-readable storage medium is provided, including the fourth aspect or the program according to the fourth aspect.

According to a twenty-sixth aspect, a relay device is provided, including a unit or means configured to perform the foregoing fifth aspect or each operation of any method according to the fifth aspect.

According to a twenty-seventh aspect, a relay device is provided, including a processor and a memory, where the memory is configured to store a program, and the processor invokes the program stored in the memory, to perform the foregoing fifth aspect or any method according to the fifth aspect.

According to a twenty-eighth aspect, a relay device is provided, including at least one processing element or chip configured to perform the foregoing fifth aspect or any method according to the fifth aspect.

According to a twenty-ninth aspect, a program is provided. When being executed by a processor, the program is configured to perform the foregoing fifth aspect or any method according to the fifth aspect.

According to a thirtieth aspect, a computer-readable storage medium is provided, including the fifth aspect or the program according to the fifth aspect.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

Figure 1:
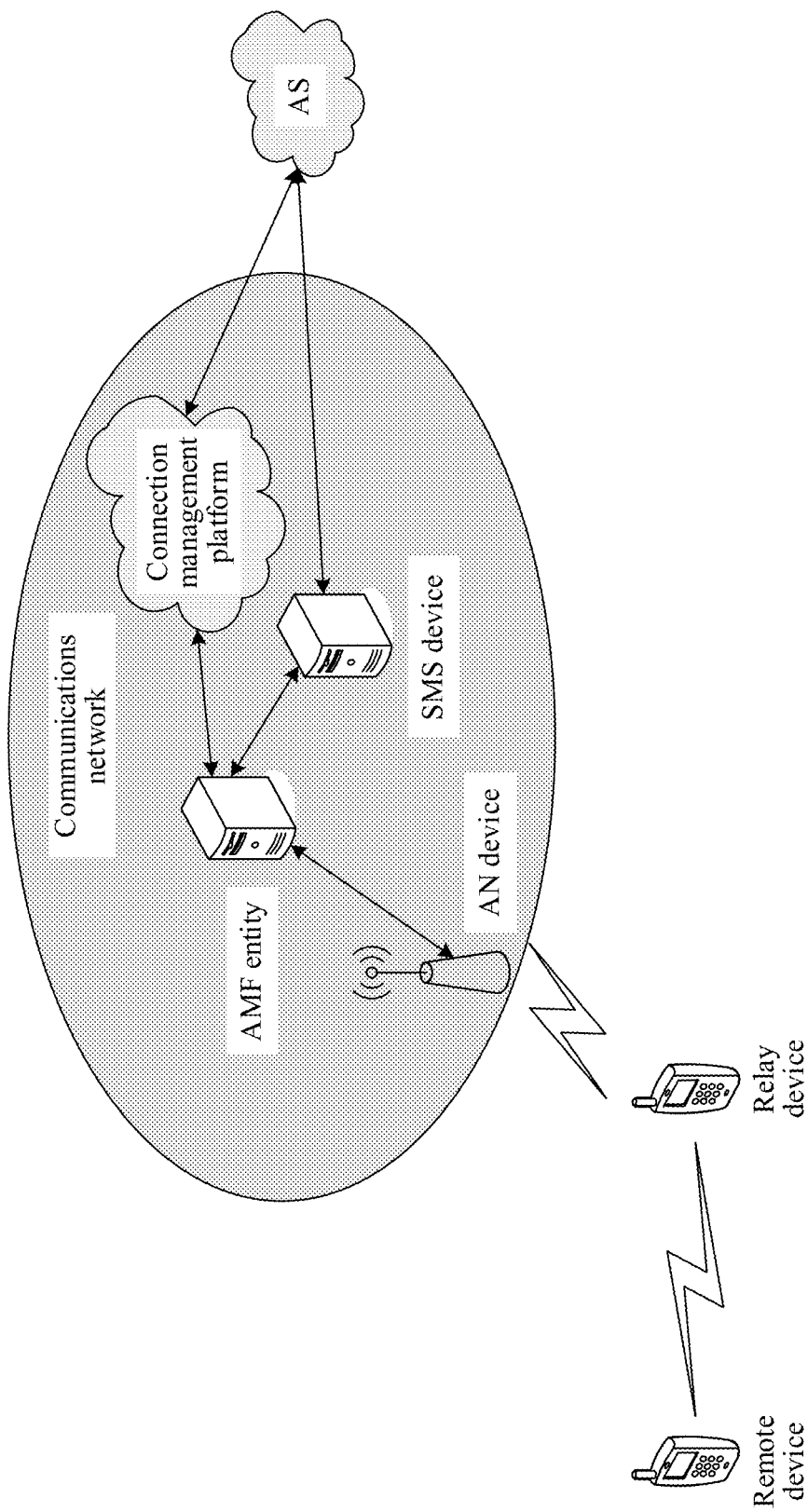
FIG. 1 is a structural diagram of a communications network.

The following describes the technical solutions in the embodiments of the present disclosure with reference to the accompanying drawings in the embodiments of the present disclosure. FIG. 1 provides a communications network structure, and the communications network structure may be applied to communications systems of different standards, for example, Long Term Evolution (LTE), a universal mobile telecommunications system (UMTS), and apparently, may also be applied to a next-generation communications system, for example, a 5G system. The following briefly describes devices related to each embodiment of this application with reference to a network structure in FIG. 1.

A remote device may include various handheld devices, in-vehicle devices, wearable devices, or computing devices that have a wireless communication function, or another processing device connected to a wireless modem, and terminals, mobile stations (MS), user equipments (UE), software clients, IoT devices, and the like in various forms, for example, a water meter, an electricity meter, or a sensor.

A relay device can perform connection management of a radio bearer through establishing a Radio Resource Control (RRC) connection and a non-access stratum (NAS) connection to an access network (AN) device, and may be, for example, a mobile phone, a terminal, UE, and the like.

An AN device may be a base station in 3GPP or a non-3GPP access point (AP) base station, for example, a base transceiver station (BTS) in a Global System For Mobile Communications (GSM) or in CDMA, or a NodeB in Wideband Code Division Multiple Access (WCDMA), where in this case, an AN node can communicate with a core network node through a base station control device, or may be an evolved Node B (eNB or e-NodeB) in LTE, a new radio NodeB (gNB) in a 5G system, or the like.

A core network device may be a serving GPRS support node (SGSN) in a UMTS or a GSM, may be a mobility management entity (MME) in an LTE system, or may be an access and mobility management function (AMF) entity or another device or node having a same or similar function in a 5G system. This is not limited. The AMF entity in FIG. 1 is used as an example.

A short message service (SMS) device refers to a device configured to process and send an SMS message, for example, a short message service gateway mobile switching center (SMS-GMSC) and a short message service interworking mobile switching center (SMS-IWMSC), or the like. The SMS-GMSC is a mobile switching center (MSC) with a gateway function, and is an ingress switch receiving the SMS message from an SMS message center. The SMS-IWMSC is the MSC with a network interaction function, and is an egress switch receiving an SMS message and sending the SMS message to a corresponding SMS message center.

A connection management platform is configured to manage a service platform of an access network in an IoT device, and includes functions such as device access authentication, connection management, data processing and forwarding, and the like.

An application server (AS) provides an application system of one or more specific service applications, includes an application program and an operating environment thereof, for example, a shared bicycle server providing a shared bicycle service application.

It should be noted that, a device that implements data transmission with the communications network through a relay device and has a wireless communication function is referred to as a remote device.

Figure 2:
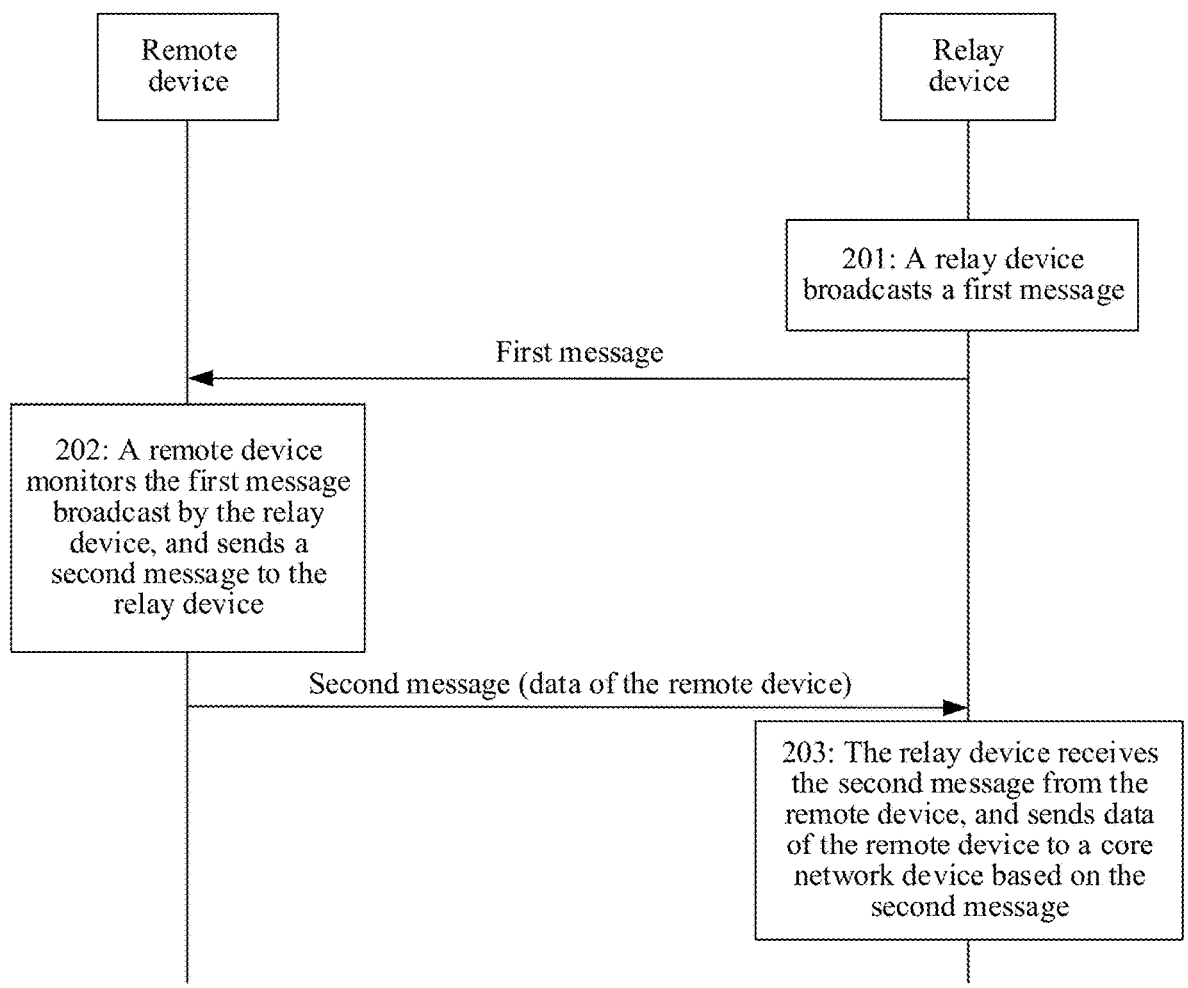
FIG. 2 is a flowchart of a data transmission method according to an embodiment of the present disclosure.

As shown in FIG. 2, this embodiment of the present disclosure provides a data transmission method. Details are provided as follows.

Operation 201: A relay device broadcasts a first message.

The first message may be used to indicate that the foregoing relay device supports data forwarding; or the first message may be used to indicate that the foregoing relay device is configured for data forwarding, in other words, used to indicate that the foregoing relay device supports forwarding data for a remote device, or used to indicate that the foregoing relay device supports forwarding or sending data of a remote device.

For example, the first message may be a discovery message, but differs from an existing discovery message in that the discovery message can carry indication information (for example, data forwarding indication information), and the indication information is used to indicate that the relay device is configured for data forwarding or configured to forward or send the data of the remote device. Obviously, the first message may in another embodiment be a newly added message, for example, a data forwarding notification message or another message used for this function. This is not limited.

In addition, the first message can carry an identity of the foregoing relay device, and the identity is used to identify the relay device, and may be a permanent identity such as an international mobile subscriber identity (IMSI) or a globally unique temporary UE identity (GUTI), or may be a temporary identity such as a temporary mobile station identity (TMSI).

Operation 202: The remote device monitors the first message broadcast by the relay device, and sends a second message to the relay device.

The second message includes the data of the remote device, and the second message may further include at least one of an authentication parameter and an identity of the remote device. For example, the data of the remote device may be packaged in an SMS message, the second message includes the SMS message, and further, the SMS message may also include the identity of the remote device.

For the identity of the foregoing remote device, refer to related descriptions of the identity of the relay device. Details are not described again. The authentication parameter is used for the relay device to perform authentication on the remote device, and may include an authentication value generated by the remote device based on a security parameter (for example, a key and an encryption algorithm). Further, the second message may also include a generation parameter of the authentication parameter, for example, a key parameter, and the generation parameter is used to generate the authentication value.

In addition, the second message may be a response message, or may be another newly added message. This is not limited.

When the first message in operation 201 includes the identity of the relay device, the second message may further carry the identity of the relay device, so that the relay device can check the remote device based on the identity. For example, when the identity carried by the second message is not the identity of the relay device itself, the relay device does not forward or send the data of the remote device, for example, discards the second message, or sends a rejection message to the remote device. When the identity carried by the second message is the identity of the relay device itself, the relay device sends the data of the remote device to a core network device, or the relay device performs operation 203. This is not limited.

Operation 203: The relay device receives the second message from the remote device, and sends the data of the remote device to the core network device based on the second message.

For the core network device, refer to related descriptions of an architecture shown in FIG. 1. Details are not described again.

The following three manners can be used to send the data of the remote device to the core network device in operation 203.

Manner 1: The relay device sends a NAS message to the core network device, and the NAS message includes the data of the foregoing remote device and relay indication information.

The relay indication information may be used to indicate that the data of the foregoing remote device is forwarded data.

Manner 2: The second message includes an SMS message, and the SMS message includes the data of the remote device; and the relay device sends a NAS message to the core network device, and the NAS message includes the SMS message in the second message.

The SMS message may further include the identity of the foregoing remote device.

Manner 3: The second message further includes the identity of the foregoing remote device, and the relay device generates an SMS message, where the SMS message includes the data of the foregoing remote device and the identity of the foregoing remote device; and the relay device sends the generated SMS message to the core network device.

It should be noted that, the foregoing three manners may also be subdivision of sending the data of the remote device to the core network device based on the second message. When the foregoing manner 2 or manner 3 is used, the relay device can add the SMS message to the NAS message and sends the NAS message carrying the SMS message to the core network device. This is not limited.

In addition, the data of the remote device that is sent by the relay device to the core network device in each embodiment of the present disclosure can be sent to the core network device through an AN device. This belongs to the prior art, and details are not described again.

In the method provided in the foregoing embodiment, the relay device broadcasts the first message, and after receiving the first message broadcast by the relay device, the remote device directly sends the data of the remote device to the relay device without establishing a connection dedicated for transmitting the data of the remote device between the remote device and the relay device, thereby reducing signaling, reducing power consumption of the remote device, and prolonging a lifecycle of the remote device. In addition, because there is no need to establish a dedicated connection, a time for establishing the connection is saved, thereby reducing latency of data transmission.

In one embodiment, in a first implementation scenario of the foregoing embodiment, when the second message further includes the authentication parameter, that the relay device sends the data of the remote device to the core network device based on the second message in operation 203 includes the following operations:

Operation 2031: The relay device performs authentication on the remote device based on the authentication parameter.

Operation 2032: The relay device sends the data of the remote device to the core network device when the remote device is authenticated successfully.

The three manners in operation 203 can be used for the relay device to send the data of the remote device to the core network device, and details are not described again.

In an example, the relay device generates an authentication parameter based on a security parameter (for example, a key and an encryption algorithm) of the remote device; and if the generated authentication parameter is the same as the authentication parameter in the second message, the remote device is authenticated successfully, and the relay device sends the data of the remote device to the core network device. The relay device can obtain the security parameter of the remote device from a connection management platform. This is not limited.

Further, before the remote device sends the second message to the relay device in operation 202, the foregoing method further includes the following.

The remote device generates the foregoing authentication parameter based on the security parameter.

The security parameter may be pre-configured in the remote device, or may be obtained from a network side in real time based on a requirement. This is not limited.

In the foregoing first implementation scenario, use of the authentication parameter ensures security of communication, and provides security of a communications network.

In one embodiment, in a second implementation scenario of the foregoing embodiment, operation 203 is implemented in the foregoing manner 1, and the foregoing method further includes the following operations.

Operation 204: The core network device receives the NAS message from the relay device, and the NAS message includes the data of the remote device and the relay indication information.

The relay indication information can be used to indicate that the data of the foregoing remote device is the forwarded data, in other words, is used to indicate that the data carried in the foregoing NAS message is not the data of the relay device itself, or is used to indicate that the data carried in the foregoing NAS message is the forwarded data. The relay indication information may include a type of the data of the remote device, that is, a type of the data carried in the NAS message, for example, data of a shared bicycle, data of a sensor, or data of a specific vendor.

It should be noted that, the forwarded data included in each embodiment may be replaced with another definition of the foregoing relay indication information, and details are not described again.

Operation 205: The core network device sends the data of the foregoing remote device based on the relay indication information.

In an example, when the relay indication information includes the type of the data of the remote device, the core network device sends the data to an AS corresponding to the type based on the foregoing type of the data of the remote device. Specifically, the core network device determines, based on the relay indication information, that received data is data of a shared bicycle, and sends the received data to an AS of the shared bicycle.

In another example, when the relay indication information indicates that the data in the NAS message is the forwarded data, the core network device sends the data of the foregoing remote device to the connection management platform. Specifically, if the core network device determines, based on the relay indication information, that the received data is the forwarded data, the core network device sends the received data to the connection management platform.

It should be noted that, the core network device may further send the data of the foregoing remote device to another service platform that can be configured to receive the data of the foregoing remote device. This is not limited to the connection management platform.

Further, the foregoing NAS message may further include a number of the data and the identity of the foregoing remote device, before sending the data of the foregoing remote device in operation 205, the method may further include the following.

The core network device performs deduplication on received data of the remote device based on the number of the foregoing data and the identity of the foregoing remote device.

For example, the core network device receives two NAS messages from the relay device, the two NAS messages carry a same identity of the remote device, and the two NAS messages carry a same number of data. The core network device can send the data in only one NAS message.

It should be noted that, the data of the remote device carried in the NAS message can be presented in a form of a packet, and a number of the data may also be a number of the packet. This is not limited.

In the foregoing second implementation scenario, the core network device identifies the data of the remote device based on the relay indication information, and further sends the data of the remote device to a corresponding AS, to complete data transmission of the remote device.

In one embodiment, in a third implementation scenario of the foregoing embodiment, operation 203 is implemented in the manner 2 or manner 3, and the foregoing method further includes the following operations:

Operation 204a: The core network device receives the SMS message from the relay device, and sends the SMS message to an SMS device.

Operation 205a: The SMS device sends the received SMS message to the AS.

The SMS device can find the AS corresponding to the remote device based on the identity of the remote device carried in the SMS message. For example, the SMS device may store a correspondence between the identity of the remote device and the AS in advance. The SMS device finds the AS corresponding to the remote device based on the identity of the remote device in the SMS message and the correspondence, and sends the SMS message to the AS.

It should be noted that, the foregoing second implementation scenario can be combined with the foregoing first implementation scenario, and the foregoing third implementation scenario can also be combined with the foregoing first implementation scenario. This is not limited.

In the foregoing third implementation scenario, the data of the remote device is carried in the SMS message, the core network device sends the SMS message to the SMS device, and the SMS device sends the data of the remote device to the corresponding AS, to complete the data transmission of the remote device.

Figure 3:
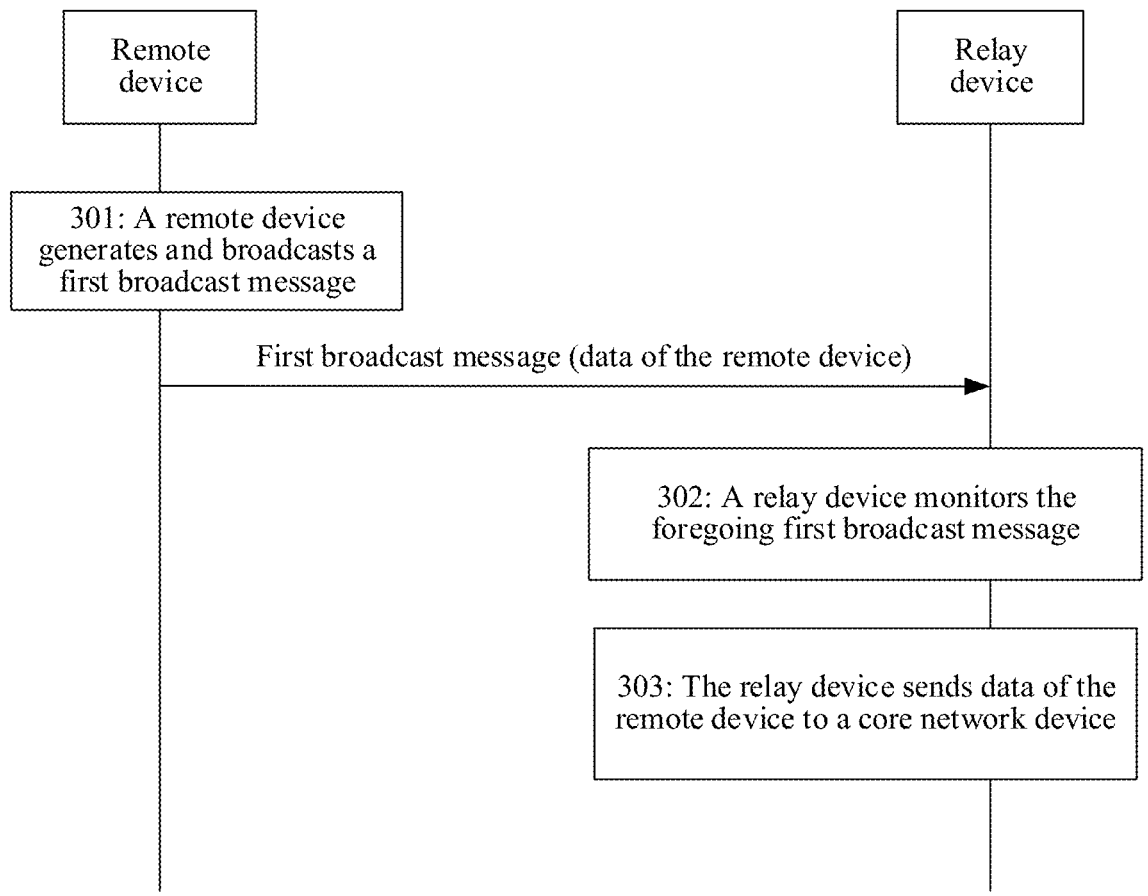
FIG. 3 is a flowchart of another data transmission method according to an embodiment of the present disclosure.

As shown in FIG. 3, this embodiment of the present disclosure provides another data transmission method, and the method specifically includes the following operations.

301: A remote device generates and broadcasts a first broadcast message.

The first broadcast message includes data of the remote device, or may further include an identity of the remote device. For the identity of the remote device, refer to related descriptions in the embodiment shown in FIG. 2. Details are not described again. Specifically, the data of the remote device can be packaged in an SMS message, and the first broadcast message includes the SMS message.

The first broadcast message may be a discovery message, or may be a newly added message. This is not limited.

Operation 302: A relay device monitors the foregoing first broadcast message.

Operation 303: The relay device sends the data of the remote device to a core network device.

Operation 303 may be implemented in the following manners.

Manner 1: The relay device sends a NAS message to the core network device, where the NAS message includes the data of the foregoing remote device and relay indication information.

The relay indication information is used to indicate that the data of the foregoing remote device is forwarded data. For details, refer to related descriptions in the embodiment shown in FIG. 2. The details are not described again.

The NAS message may further include the identity of the foregoing remote device and a number of the data. For details, refer to related descriptions in the embodiment shown in FIG. 2. The details are not described again.

Manner 2: The first broadcast message includes the SMS message, the SMS message includes the data of the foregoing remote device and the identity of the foregoing remote device, and the relay device sends the SMS message to the core network device.

Manner 3: The relay device generates the SMS message, and sends the generated SMS message to the core network device.

The SMS message includes the data of the foregoing remote device and the identity of the foregoing remote device.

In addition, the SMS message in the foregoing manner 2 and manner 3 can be carried in the NAS message and be sent to the core network device. This is not limited.

It should be noted that, monitoring included in each embodiment of the present disclosure belongs to the prior art, for example, monitoring in that the relay device monitors the first broadcast message or that the remote device monitors the first message. Therefore, how to implement the monitoring is not described again in the embodiments of the present disclosure.

In the method provided in the foregoing embodiment, the remote device sends the data of the remote device to the relay device by broadcasting the first broadcast message without establishing a connection dedicated for transmitting the data of the remote device between the remote device and the relay device, thereby reducing signaling, reducing power consumption of the remote device, and prolonging a lifecycle of the remote device. In addition, because there is no need to establish a dedicated connection, a time for establishing the connection is saved, thereby reducing latency of data transmission. After receiving the first broadcast message, the relay device sends the data of the remote device to the core network device, to complete data transmission of the remote device.

In one embodiment, in a first implementation scenario of the foregoing embodiment, the foregoing method further includes the following operations.

Operation 304: The relay device broadcasts a second broadcast message.

The second broadcast message is used to indicate that the data of the foregoing remote device is forwarded or sent by the relay device, and the second broadcast message may include the identity of the foregoing remote device. Further, the second broadcast message may also carry an identity of the relay device. The second broadcast message may be a message in the prior art, or may be a newly added message, for example, a data relay indication message. This is not limited.

Correspondingly, after receiving the second broadcast message, another relay device may determine, based on the second broadcast message, to skip forwarding or sending the received data of the remote device in the first broadcast message, so that the core network device is prevented from receiving the data of the remote device forwarded or sent by different relay devices, and waste of an air interface resource is also avoided.

It should be noted that operation 304 may be performed after operation 302 and before operation 303, or may be performed after operation 303. This is not limited.

In one embodiment, in a second implementation scenario of the foregoing embodiment, the foregoing first broadcast message further includes an authentication parameter, and before operation 301, the foregoing method further includes the following operations.

The remote device generates an authentication parameter based on a security parameter.

The security parameter may include a key and an encryption algorithm, may specifically be pre-configured in the remote device, or may be obtained from a network side in real time based on a requirement. This is not limited.

Further, before operation 303, the foregoing method may further include: performing, by the relay device, authentication on the remote device based on the authentication parameter in the first broadcast message; and performing operation 303 or operation 303 to operation 304 when the remote device is authenticated successfully.

In an example, the relay device generates an authentication parameter based on the security parameter (for example, the key and the encryption algorithm) of the remote device; and if the generated authentication parameter is the same as the authentication parameter in the first broadcast message, the remote device is authenticated successfully, and the relay device sends the data of the remote device to the core network device. The relay device can obtain the security parameter of the remote device from a connection management platform. Further, the first broadcast message may further include a generation parameter of the authentication parameter, for example, a key parameter, and details are not described again. In addition, for the authentication parameter, refer to related descriptions in the embodiment shown in FIG. 2. This is not limited.

In the foregoing second implementation scenario, use of the authentication parameter ensures security of communication, and provides security of a communications network.

In one embodiment, in a third implementation scenario of the foregoing embodiment, operation 303 is implemented in the foregoing manner 1, and the foregoing method further includes the following operations.

Operation 305: The core network device receives a NAS message from the relay device, where the NAS message includes the data of the remote device and the relay indication information.

The relay indication information may be used to indicate that the data of the foregoing remote device is forwarded data. For details, refer to related descriptions in the embodiment shown in FIG. 2. The relay indication information may include a type of the data of the remote device, for example, data of a shared bicycle, data of a sensor, or data of a specific vendor.

Operation 306: The core network device sends the data of the foregoing remote device based on the relay indication information.

In an example, when the relay indication information includes the type of the data of the remote device, the core network device sends the data to an application server corresponding to the type based on the foregoing type of the data of the remote device. Specifically, the core network device determines, based on the relay indication information, that received data is data of a shared bicycle, and sends the received data to an AS of the shared bicycle.

In another example, when the relay indication information indicates that the data in the NAS message is the forwarded data, the core network device sends the data of the foregoing remote device to the connection management platform. Specifically, the core network device determines, based on the relay indication information, that the received data is the forwarded data, and sends the received data to the connection management platform.

Further, the foregoing NAS message may further include a number of the data and the identity of the foregoing remote device, and before sending the data of the foregoing remote device in operation 306, the method may further include the following operations.

The core network device performs deduplication on received data of the remote device based on the foregoing number of the data and the identity of the foregoing remote device.

For example, the core network device receives two NAS messages from the relay device, the two NAS messages carry a same identity of the remote device, and the two NAS messages carry a same number of data. The core network device can send the data in only one NAS message.

It should be noted that, the data of the remote device carried in the NAS message can be presented in a form of a packet, and a number of the data may also be a number of the packet. This is not limited.

In the foregoing third implementation scenario, the core network device identifies the data of the remote device based on the relay indication information, and further sends the data of the remote device to a corresponding AS, to complete data transmission of the remote device.

In one embodiment, in a fourth implementation scenario of the foregoing embodiment, operation 303 is implemented in the manner 2 or manner 3, the foregoing method further includes the following operations:

Operation 305a: The core network device receives the SMS message from the relay device, and sends the SMS message to an SMS device.

Operation 306a: The SMS device sends the received SMS message to the AS.

The SMS device can find the AS corresponding to the remote device based on the identity of the remote device carried in the SMS message. For example, the SMS device may store a correspondence between the identity of the remote device and the AS in advance, and the SMS device finds the AS corresponding to the remote device based on the identity of the remote device in the SMS message and the correspondence, and sends the SMS message to the AS.

In the foregoing fourth implementation scenario, the data of the remote device is carried in the SMS message, the core network device sends the SMS message to the SMS device, and the SMS device sends the data of the remote device to the corresponding AS, to complete the data transmission of the remote device.

It should be noted that, the foregoing implementation scenarios can be combined with each other. This is not limited. For example, the second implementation scenario may be combined with the foregoing first implementation scenario, the foregoing third implementation scenario may be combined with the foregoing second implementation scenario, and the foregoing fourth implementation scenario may be combined with the foregoing second implementation scenario.

Figure 4:
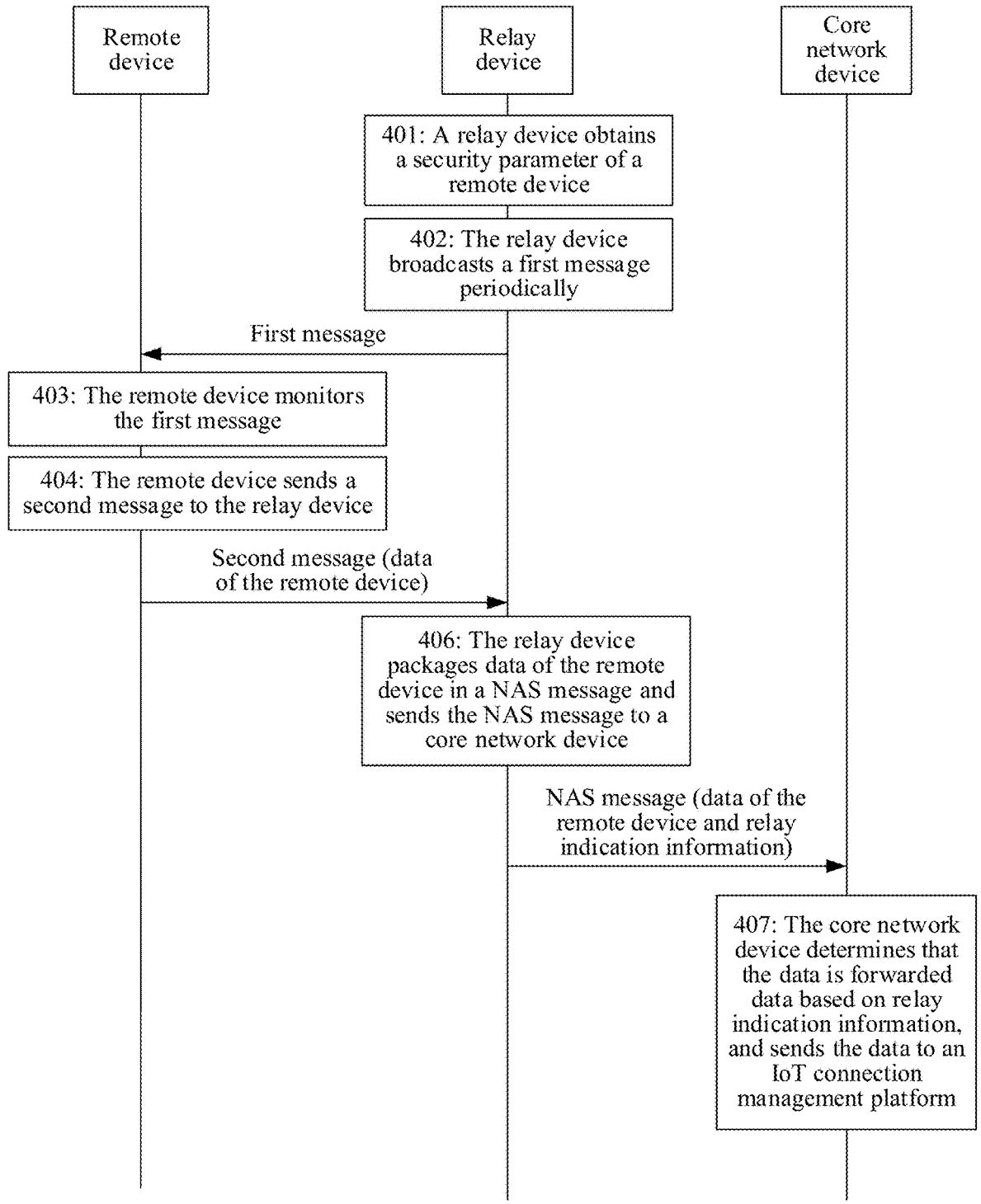
FIG. 4 is a flowchart of still another data transmission method according to an embodiment of the present disclosure.

As shown in FIG. 4, this embodiment of the present disclosure provides another data transmission method, and the method may specifically include the following operations.

Operation 401: A relay device obtains a security parameter of a remote device.

The foregoing security parameter may be used for relay transmission of the remote device, and may specifically include a key and an encryption algorithm.

For example, the relay device can obtain the foregoing security parameter of the relay transmission through an IoT connection management platform. In an actual application, all remote devices may use a same security parameter, or different types of remote devices may use different security parameters. For example, in a shared bicycle-type IoT device, a key used for authentication is Key 1, and an encryption algorithm is A, and in a sensor-type IoT device, a key used for authentication is Key 2, and an encryption algorithm is B.

It should be noted that, operation 401 is an optional operation. This is not limited.

Operation 402: The relay device broadcasts a first message periodically.

The first message is used to indicate that the relay device supports data forwarding, for example, used to indicate to the remote device that the relay device can forward data for the remote device. For related definitions, refer to related descriptions in the embodiment shown in FIG. 2. Details are not described again.

In addition, the first message may carry an identity of the relay device.

Operation 403: The remote device monitors the first message.

For example, the remote device can start to monitor the first message when there is data transmission. When the remote device monitors the first message, it indicates that near the remote device, there is a relay device that may be configured to forward or send data of the remote device. The remote device can monitor a broadcast message when there is data transmission, to further reduce power consumption of the remote device.

Operation 404: The remote device sends a second message to the relay device.

The second message carries the data of the foregoing remote device.

In one embodiment, the second message carries at least one of an authentication parameter, the identity of the relay device, and an identity of the remote device. The identity of the remote device may be used for charging, or may be used for an SMS device to forward or send the data of the remote device to a corresponding AS. Both the identity of the relay device and the authentication parameter may be used to perform security verification on the remote device.

The authentication parameter may be generated by the remote device based on the security parameter, and the security parameter can be pre-configured in the remote device.

Further, when the second message caries the authentication parameter, operation 405a may be performed; or when the second message carries the identity of the relay device, operation 405b is performed; or when the second message carries the authentication parameter and the identity of the relay device, operation 405c is performed. Operation 405a to operation 405c are all optional operations.

Operation 405a: The relay device performs authentication on the remote device based on the obtained security parameter and the authentication parameter received from the remote device.

In an example, the remote device generates an authentication parameter (referred to as AUTN1), that is, the authentication parameter in the second message, through a pre-configured security parameter (for example, the key and the encryption algorithm). The relay device generates an authentication parameter (referred to as AUTN2) based on the obtained security parameter. The relay device compares the two authentication parameters. If the two authentication parameters are the same, it indicates that the remote device is authenticated successfully.

In another example, the remote device generates AUTN1 through the pre-configured security parameter (for example, the key and the encryption algorithm) and a generation parameter of the authentication parameter, for example, a key parameter. The second message includes AUTN1 and the generation parameter. The relay device generates the AUTN2 based on the obtained security parameter and the generation parameter in the second message. The relay device compares the two authentication parameters. If the two authentication parameters are the same, it indicates that the remote device is authenticated successfully.

If the remote device is authenticated successfully, it indicates that the remote device is a legitimate device and can continue to perform operation 406.

Operation 405*b*: The relay device determines whether the identity of the relay device carried in the second message is the identity of the relay device itself, and if the identity of the relay device carried in the second message is the identity of the relay device itself, performs operation 406; otherwise, discards the second message or replies with a rejection message.

Operation 405*c*: When the relay device determines that the identity of the relay device carried in the second message is the identity of the relay device itself, perform operation 405*a*, and if the remote device is authenticated successfully in operation 405*a*, perform operation 406.

Obviously, in operation 405*c*, authentication on the remote device can be performed first, and the relay device determines whether the identity of the relay device carried in the second message is the identity of the relay device itself when the remote device is authenticated successfully. This is not limited.

Operation 406: The relay device packages the data of the remote device in a NAS message and sends the NAS message to a core network device.

The NAS message further carries relay indication information, and the relay indication information is used to indicate that the data in the NAS message is forwarded data, in other words, the data in the NAS message is not the data of the relay device itself.

Operation 407: The core network device determines that the data is the forwarded data based on the relay indication information, and sends the data to the IoT connection management platform.

For example, the core network device pre-configures a forwarding policy, for example, provided that the data is the forwarded data, the core network device sends the data to the IoT connection management platform, and then, the IoT connection management platform further forwards or sends the data to a corresponding AS.

In one embodiment, the relay indication information includes a type of the data forwarded by the relay device (for example, data of a shared bicycle or data of a sensor), and operation 407 can be replaced with the following: The core network device sends the data of the remote device to the corresponding AS based on the relay indication information. For example, different data types correspond to different ASs, and the core network device may send the data of the remote device to the corresponding AS based on a correspondence between a data type and an AS.

It should be noted that, for operations, nouns, and the like included in the embodiment shown in FIG. 4, refer to the embodiment shown in FIG. 2 or 3. Details are not described again.

In the method provided in the foregoing embodiment, the relay device broadcasts the first message, and after receiving the first message broadcast by the relay device, the remote device directly sends the data of the remote device to the relay device without establishing a connection dedicated for transmitting the data of the remote device between the remote device and the relay device, thereby reducing signaling and reducing power consumption of the remote device. In addition, because there is no need to establish a dedicated connection, a time for establishing the connection is saved, thereby reducing latency of data transmission.

This embodiment of the present disclosure provides another data transmission method, and the method differs from the embodiment shown in FIG. 4 in the following:

Operation 406 is replaced with the following: The relay device packages the data of the remote device in the SMS message and sends the SMS message to the core network device.

For the implementation of operation 406, refer to the manner 3 in operation 203. Details are not described again.

In one embodiment, when the first message carries the SMS message, and the SMS message includes the data of the remote device, operation 406 may in another embodiment be replaced with the following: The relay device packages the SMS message in the first message in the NAS message and sends the NAS message to the core network device.

Correspondingly, operation 407 can be replaced with the following: The core network device receives the SMS message from the relay device, and sends the SMS message to an SMS device.

Operation 408: The SMS device sends the received SMS message to the AS.

For operation 407 to operation 408, refer to related descriptions of operations 204*a* and 205*a*. Details are not described again.

Different from the embodiment shown in FIG. 4, in the method provided in the foregoing embodiment, signaling, power consumption of the remote device, and latency of data transmission can be also reduced without establishing a dedicated connection. In addition, the method provided in the foregoing embodiment is mainly applicable to a scenario that the remote device communicates with the AS through the SMS message. In an actual application, the data transmission method can be determined based on capabilities (for example, whether supports an SMS message) of the remote device and the AS, thereby increasing flexibility and an application scope of the present disclosure.

Figure 5:
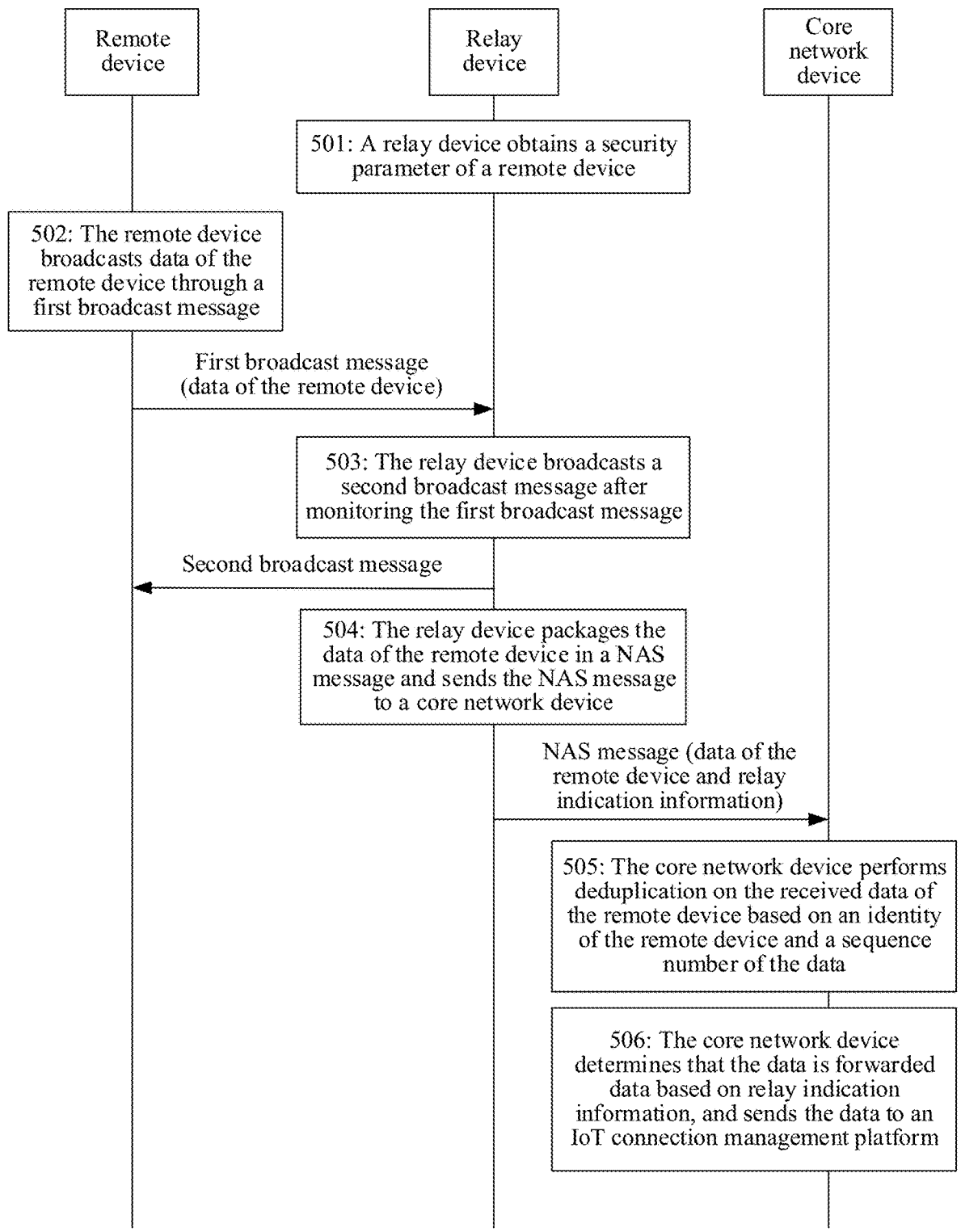
FIG. 5 is a flowchart of yet another data transmission method according to an embodiment of the present disclosure.

As shown in FIG. 5, this embodiment of the present disclosure provides another data transmission method, and the method may specifically include the following operations.

Operation 501: A relay device obtains a security parameter of a remote device.

The relay device can obtain the security parameter of the remote device from an IoT connection management platform. For specific details, refer to related descriptions of operation 401, and details are not described again.

Operation 502: The remote device broadcasts data of the remote device through a first broadcast message.

The first broadcast message may further carry at least one of an identity of the remote device and an authentication parameter.

The remote device can prearrange the foregoing security parameter such as a key and an encryption algorithm.

An execution order of operation 501 and operation 502 may be adjusted. This is not limited.

Operation 503: The relay device broadcasts a second broadcast message after monitoring the first broadcast message.

The second broadcast message is used to indicate that the data of the foregoing remote device is forwarded or sent by the relay device, and it is avoided that a plurality of relay devices simultaneously forward or send the data of the remote device. For the second broadcast message, refer to related descriptions in the embodiment shown in FIG. 3, and details are not described again.

When the first broadcast message carries the authentication parameter, operation 503a may also be performed.

Operation 503a: The relay device performs authentication on the remote device based on the security parameter of the remote device and the authentication parameter in the first broadcast message.

It should be noted that, operation 503a may be performed before broadcasting the second broadcast message, or may be performed after broadcasting the second broadcast message. This is not limited.

In an example, it is assumed that operation 503a is performed before broadcasting the second broadcast message, then, when the remote device is authenticated successfully in operation 503a (that is, the remote device is a legal device), the relay device broadcasting a second broadcast message in operation 503 continues to be performed.

In another example, it is assumed that operation 503a is performed after broadcasting the second broadcast message, then, when the remote device is authenticated successfully in operation 503a (that is, the remote device is a legal device), continue to perform operation 504.

It should be noted that, for an authentication procedure, refer to operation 405a. Details are not described again.

Operation 504: The relay device packages the data of the remote device in a NAS message and sends the NAS message to a core network device.

The NAS message further carries relay indication information, and the relay indication information is used to indicate that the data in the NAS message is forwarded data, in other words, the data in the NAS message is not the data of the relay device itself.

In one embodiment, the NAS message may further carry the identity of the remote device and a sequence number of data. The identity of the remote device may be used to send the data of the remote device to a corresponding AS, or may be used for charging, or may be used to perform deduplication on the data of the remote device; and the sequence number of the data may be a serial number of a packet, or may be used for the core network device to perform the deduplication on the data of the remote device. This is not limited.

Operation 505: The core network device performs the deduplication on received data of the remote device based on the identity of the remote device and the sequence number of the data.

Operation 505 is an optional operation, and operation 506 can be directly performed after operation 504. This is not limited.

Operation 506: The core network device determines that the data is forwarded data based on the relay indication information, and sends the data to the IoT connection management platform.

For example, the core network device pre-configures a forwarding policy, for example, provided that the data is the forwarded data, the core network device sends the data to the IoT connection management platform, so that the IoT connection management platform further sends the data to the corresponding AS.

In one embodiment, the relay indication information includes a type of the data forwarded by the relay device (for example, data of a shared bicycle, data of a sensor), and operation 506 can be replaced with the following: The core network device forwards or sends the data of the remote device to the corresponding AS based on the relay indication information. For related descriptions, refer to the embodiment shown in FIG. 4. Details are not described again.

It should be noted that, for operations, nouns, and the like included in the embodiment shown in FIG. 5, refer to the embodiment shown in FIG. 2 or 3. Details are not described again.

In the method provided in the foregoing embodiment, the remote device sends the data of the remote device to the relay device by broadcasting the first broadcast message without establishing a connection dedicated for transmitting the data of the remote device between the remote device and the relay device, thereby reducing signaling and reducing power consumption of the remote device. In addition, because there is no need to establish a dedicated connection, a time for establishing the connection is saved, thereby reducing latency of data transmission. After receiving the first broadcast message, the relay device sends the data of the remote device to the core network device, to complete data transmission of the remote device.

This embodiment of the present disclosure provides another data transmission method, and the method differs from the embodiment shown in FIG. 5 in the following:

Operation 504 is replaced with the following: The relay device packages the data of the remote device in an SMS message and sends the SMS message to the core network device.

For the implementation of operation 504, refer to the manner 3 in operation 303. Details are not described again.

In one embodiment, when the first broadcast message carries the SMS message, and the SMS message includes the data of the remote device, operation 504 may in another embodiment be replaced with the following: The relay device packages the SMS message in the first broadcast message in the NAS message and sends the NAS message to the core network device.

Correspondingly, operation 506 can be replaced with the following: The core network device receives the SMS message from the relay device, and sends the SMS message to an SMS device.

Operation 507: The SMS device sends the received SMS message to the AS.

For operation 506 to operation 507, refer to related descriptions of operations 204a and 205a. Details are not described again.

Different from the embodiment shown in FIG. 5, in the method provided in the foregoing embodiment, signaling, power consumption of the remote device, and latency of data transmission can be also reduced without establishing a dedicated connection. In addition, the method provided in the foregoing embodiment is mainly applicable to a scenario that the remote device communicates with the AS through the SMS message. In an actual application, the data transmission method can be determined based on capabilities (for example, whether supports an SMS message) of the remote device and the AS, thereby increasing flexibility and an application scope of the present disclosure.

Figure 6:
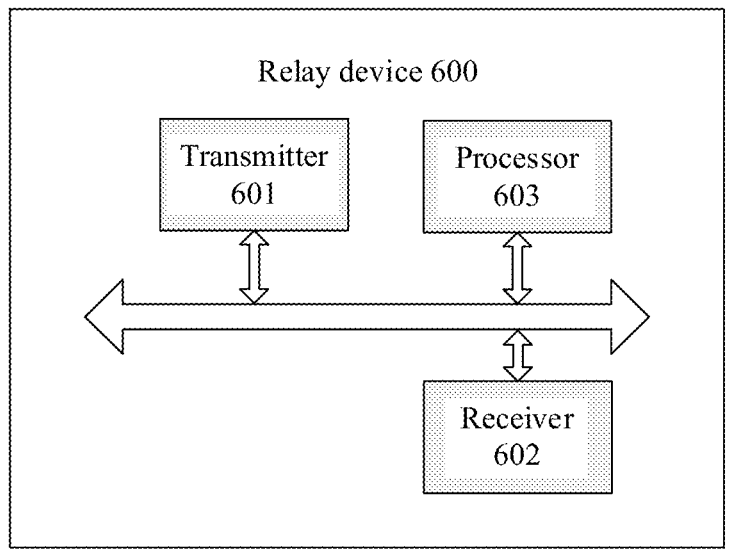
FIG. 6 is a schematic structural diagram of a relay device according to an embodiment of the present disclosure.

As shown in FIG. 6, this embodiment of the present disclosure provides a relay device 600, and the relay device 600 may be configured to perform the operation of the relay device of the embodiment shown in FIG. 2 or FIG. 4. The relay device 600 includes a transmitter 601, a receiver 602, and a processor 603, and details are described as follows:

The transmitter 601 is configured to broadcast a first message, where the first message is used to indicate that the relay device 600 supports data forwarding;

The receiver 602 is configured to receive a second message from a remote device, where the second message includes data of the remote device.

The processor 603 is configured to send the data of the remote device to a core network device based on the second message received by the receiver 602.

The transmitter 601 and the receiver 602 can be replaced with a transceiver. This is not limited.

In one embodiment, the foregoing second message further includes at least one of an authentication parameter and an identity of the foregoing remote device. For the authentication parameter, the identity of the remote device, and the like, refer to related descriptions in the embodiment shown in FIG. 2. Details are not described again.

When the second message includes the authentication parameter, the foregoing sending the data of the remote device to a core network device based on the second message may include: performing authentication on the remote device based on the authentication parameter; and sending the data of the remote device to the core network device when the remote device is authenticated successfully.

The sending the data of the remote device to a core network device may include: sending a NAS message to the core network device, where the NAS message includes the data of the remote device and relay indication information, and the relay indication information is used to indicate that the data in the NAS message is forwarded data.

In another embodiment, the second message includes an SMS message, and the SMS message includes the data of the remote device and the identity of the remote device; the sending the data of the remote device to a core network device may include: sending, the NAS message to the core network device, where the NAS message includes the SMS message in the second message.

In another embodiment, the second message further includes the identity of the remote device; and the sending the data of the remote device to a core network device may include: generating and sending, the SMS message to the core network device, where the SMS message includes the data of the remote device and the identity of the remote device.

In another embodiment, the foregoing transmitter 601 may be a sending unit, the receiver 602 may be a receiving unit, and the processor 603 may be a processing unit.

In another embodiment, an action of the foregoing relay device may be stored in a memory in a form of a program, and at least one processor reads the program from the memory and executes the program, to implement a function of the relay device in the embodiment shown in the foregoing FIG. 2 or FIG. 4.

In another embodiment, the foregoing relay device may include a chip, and the chip is configured to perform the action of the relay device of the embodiment shown in the foregoing FIG. 2 or FIG. 4.

The relay device provided in the foregoing embodiment broadcasts the first message, so that after receiving the first message broadcast by the relay device, the remote device directly sends the data of the remote device to the relay device without establishing a connection dedicated for transmitting the data of the remote device between the remote device and the relay device, thereby reducing signaling, reducing power consumption of the remote device, and prolonging a lifecycle of the remote device. In addition, because there is no need to establish a dedicated connection, a time for establishing the connection is saved, thereby reducing latency of data transmission.

Figure 7:
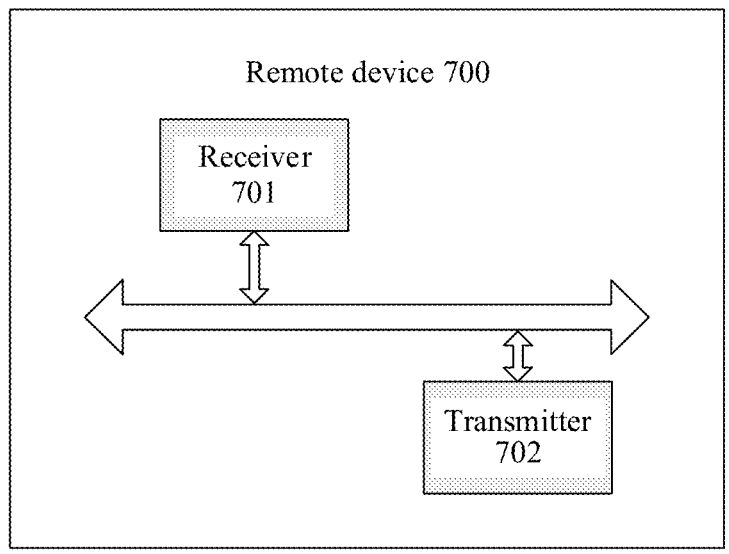
FIG. 7 is a schematic structural diagram of a remote device according to an embodiment of the present disclosure.

As shown in FIG. 7, this embodiment of the present disclosure provides a remote device 700, and the remote device 700 may be configured to perform the operation of the remote device in the embodiment shown in FIG. 2 or FIG. 4. The remote device 700 includes a receiver 701 and a transmitter 702, and details are described as follows.

The receiver 701 is configured to monitor a first message broadcast by a relay device, where the first message is used to indicate that the relay device supports data forwarding.

For a related definition of the first message, refer to the foregoing method embodiment. Details are not described again.

The transmitter 702 is configured to send a second message to the relay device, where the second message includes data of the remote device 700.

In one embodiment, the second message further includes at least one of an authentication parameter and an identity of the remote device. For details, refer to related descriptions in the embodiment shown in FIG. 2. Details are not described again.

The transmitter 702 and the receiver 701 may be replaced with a transceiver. This is not limited.

In another embodiment, the foregoing receiver 701 may be a receiving unit, and the transmitter 702 may be a sending unit.

In another embodiment, an action of the foregoing remote device may be stored in a memory in a form of a program, and at least one processor reads the program from the memory and executes the program, to implement a function of the remote device in the embodiment shown in the foregoing FIG. 2 or FIG. 4.

In another embodiment, the foregoing remote device may include a chip, and the chip is configured to perform the action of the remote device in the embodiment shown in the foregoing FIG. 2 or FIG. 4.

The remote device provided in the foregoing embodiment, after receiving the first message broadcast by the relay device, directly sends the data of the remote device to the relay device without establishing a connection dedicated for transmitting the data of the remote device between the remote device and the relay device, thereby reducing signaling, reducing power consumption of the remote device, and prolonging a lifecycle of the remote device. In addition, because there is no need to establish a dedicated connection, a time for establishing the connection is saved, thereby reducing latency of data transmission.

Figure 8:
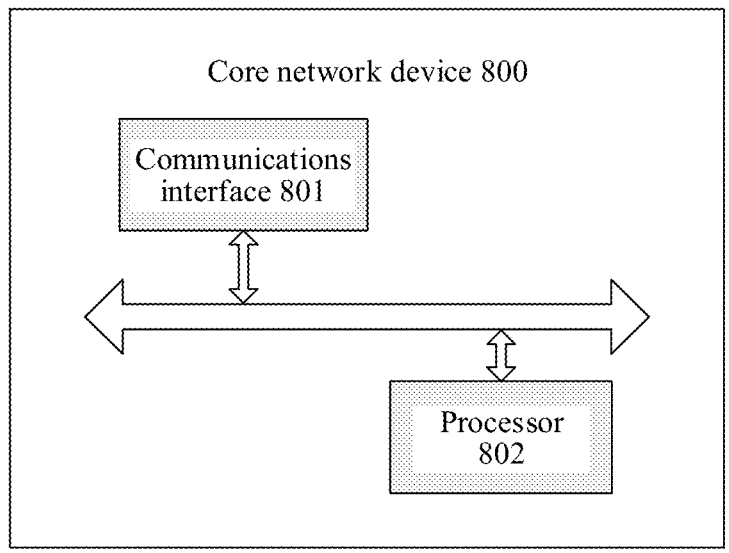
FIG. 8 is a schematic structural diagram of a core network device according to an embodiment of the present disclosure.

As shown in FIG. 8, this embodiment of the present disclosure provides a core network device 800, and the core network device 800 may be configured to perform the operation of the core network device in the foregoing method embodiments. The core network device 800 includes a communications interface 801 and a processor 802, and details are described as follows:

The communications interface 801 is configured to receive a NAS message from a relay device, where the NAS message includes data of a remote device and relay indication information, and the relay indication information is used to indicate that data in the NAS message is forwarded data.

The processor 802 is configured to send the data of the remote device based on the relay indication information received by the communications interface 801.

In one embodiment, the foregoing relay indication information includes a type of the data of the remote device; and the foregoing sending the data of the remote device based on the relay indication information includes: sending the data of the remote device to an AS corresponding to the type based on the foregoing type.

In one embodiment, the foregoing sending the data of the remote device based on the relay indication information includes:

sending the foregoing data to a connection management platform when the foregoing relay indication information indicates that the data is forwarded data.

In another embodiment, the foregoing communications interface 801 may be a receiving unit and the processor 802 may be a sending unit.

In another embodiment, an action of the foregoing core network device may be stored in a memory in a form of a program, and at least one processor reads the program from the memory and executes the program, to implement a function of the core network device in the foregoing each method embodiments.

In another embodiment, the foregoing core network device may include a chip, and the chip is configured to perform the action of the remote device in the foregoing method embodiments.

Figure 9:
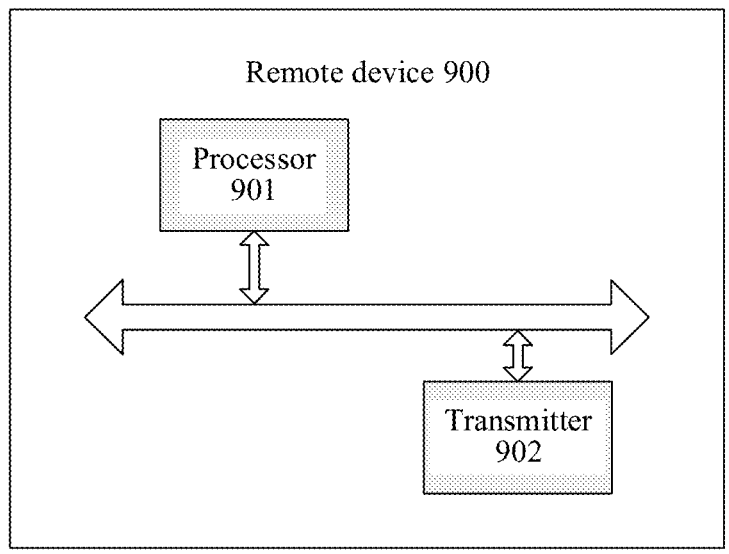
FIG. 9 is a schematic structural diagram of another remote device according to an embodiment of the present disclosure.

As shown in FIG. 9, this embodiment of the present disclosure provides a remote device 900, and the remote device 900 may be configured to perform the operation of the remote device in the embodiment shown in FIG. 3 or FIG. 5. The remote device 900 includes a processor 901 and a transmitter 902, and details are described as follows:

The processor 901 is configured to generate a broadcast message, where the broadcast message includes data of the remote device 900 and an identity of the remote device 900.

The transmitter 902 is configured to broadcast the broadcast message generated by the foregoing processor 901.

In one embodiment, the broadcast message may further include an authentication parameter. For the authentication parameter, refer to related descriptions of the foregoing method embodiment. Details are not described again.

In another embodiment, the foregoing processor 901 may be a processing unit, and the transmitter 902 may be a sending unit.

In another embodiment, an action of the foregoing remote device may be stored in a memory in a form of a program, and at least one processor reads the program from the memory and executes the program, to implement a function of the remote device in the method embodiment shown in the foregoing FIG. 3 or FIG. 5.

In another embodiment, the foregoing remote device may include a chip, and the chip is configured to perform the action of the remote device in the method embodiment shown in the foregoing FIG. 3 or FIG. 5.

The remote device provided in the foregoing embodiment sends the data of the remote device to the relay device by broadcasting a first broadcast message without establishing a connection dedicated for transmitting the data of the remote device between the remote device and the relay device, thereby reducing signaling, reducing power consumption of the remote device, and prolonging a lifecycle of the remote device. In addition, because there is no need to establish a dedicated connection, a time for establishing the connection is saved, thereby reducing latency of data transmission.

Figure 10:
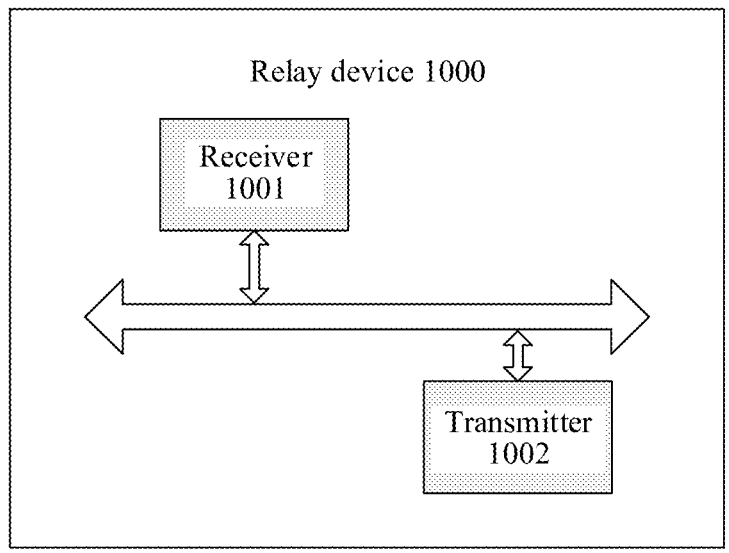
FIG. 10 is a schematic structural diagram of another relay device according to an embodiment of the present disclosure.

As shown in FIG. 10, this embodiment of the present disclosure provides a relay device 1000, and the relay device 1000 may be configured to perform the operation of the relay device in the embodiment shown in FIG. 3 or FIG. 5. The relay device 1000 includes a receiver 1001 and a transmitter 1002, and details are described as follows:

The receiver 1001 is configured to monitor a first broadcast message, where the first broadcast message includes data of a remote device and an identity of the remote device.

The transmitter 1002 is configured to send the data of the remote device to a core network device.

In one embodiment, the transmitter 1002 is further configured to broadcast a second broadcast message.

The second broadcast message includes the identity of the remote device, and the second broadcast message is used to indicate that the data of the remote device is forwarded by the relay device 1000. For a related definition, refer to the foregoing method embodiment. Details are not described again.

In one embodiment, the foregoing first broadcast message further includes an authentication parameter, and the relay device 1000 further includes a processor 1003.

The processor 1003 is configured to perform authentication on the remote device based on the authentication parameter; and when the remote device is authenticated successfully, trigger the transmitter 1002 to perform the foregoing sending the data of the remote device to a core network device.

In one embodiment, the foregoing send the data of the remote device to a core network device includes: sending, a NAS message to the core network device, where the NAS message includes the data of the remote device and relay indication information, and the relay indication information is used to indicate that the data in the NAS message is forwarded data.

In another embodiment, the foregoing send the data of the remote device to a core network device includes: generating and sending an SMS message to the core network device, where the SMS message includes the data of the remote device and the identity of the remote device.

In another embodiment, the foregoing first broadcast message includes the SMS message, and the SMS message includes the data of the remote device and the identity of the remote device; and the foregoing send the data of the remote device to a core network device includes: sending the NAS message to the core network device, where the NAS message includes the SMS message in the second message.

The transmitter 1002 and the receiver 1001 can be replaced with a transceiver, and are not limited.

It should be noted that, for nouns or operations involved in the embodiment of the foregoing FIG. 6 to FIG. 10, refer to related descriptions of the foregoing method embodiment, and details are not described again.

In another embodiment, the foregoing receiver 1001 may be a receiving unit, the transmitter 1002 may be a sending unit, and the processor 1003 may be a processing unit.

In another embodiment, an action of the foregoing relay device may be stored in a memory in a form of a program, and at least one processor reads the program from the memory and executes the program, to implement a function of the relay device in the method embodiment shown in the foregoing FIG. 3 or FIG. 5.

In another embodiment, the foregoing relay device may include a chip, and the chip is configured to perform the action of the relay device in the method embodiment shown in the foregoing FIG. 3 or FIG. 5.

The relay device provided by the foregoing embodiment receives the first broadcast message, where the first broadcast message carries the data of the remote device, without establishing a connection dedicated for transmitting the data of the remote device between the remote device and the relay device, thereby reducing signaling, reducing power consumption of the remote device, and prolonging a lifecycle of the remote device. In addition, because there is no need to establish a dedicated connection, a time for establishing the connection is saved, thereby reducing latency of data transmission.

Figure 11:
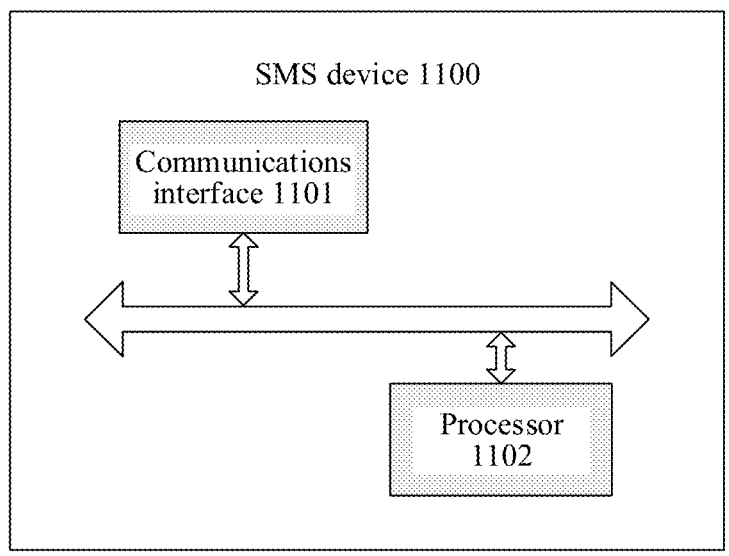
FIG. 11 is a schematic structural diagram of an SMS device according to an embodiment of the present disclosure.

As shown in FIG. 11, this embodiment of the present disclosure provides an SMS device 1100, and the SMS device 1100 may be configured to perform the operation of the SMS device in the foregoing method embodiments. The SMS device 1100 includes a communications interface 1101 and a processor 1102, and details are described as follows:

The communications interface 1101, configured to receive an SMS message from a core network device, where the SMS message includes data of a remote device and an identity of the remote device.

The processor 1102, configured to send, based on the identity of the remote device in the SMS message, the data of the remote device to a corresponding AS.

For example, the AS corresponding to the remote device can be found based on the identity of the remote device carried in the SMS message. The SMS device may store a correspondence between the identity of the remote device and the AS in advance, and finds the AS corresponding to the remote device and sends the SMS message to the AS based on the identity of the remote device in the SMS message and the correspondence.

Figure 12:
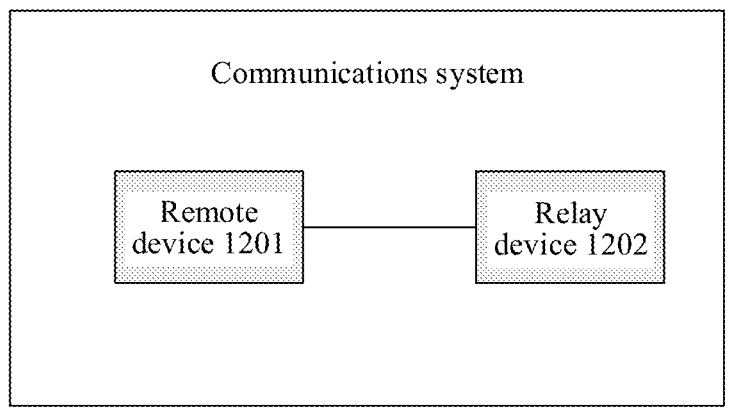
FIG. 12 is a schematic structural diagram of a communications system according to an embodiment of the present disclosure.

As shown in FIG. 12, this embodiment of the present disclosure provides a communications system, and the communications system may include a remote device 1201 and a relay device 1202.

For the remote device 1201, refer to the remote device 700 shown in FIG. 7, and for the relay device 1202, refer to the relay device 600 shown in FIG. 6; or for the remote device 1201, refer to the remote device 900 shown in FIG. 9, and for the relay device 1202, refer to the relay device 1000 shown in FIG. 10.

In one embodiment, the communications system further includes a core network device 1203. For the core network device 1203, refer to the core network device 800 shown in FIG. 8.

In one embodiment, the communications system further includes the core network device 1203 and an SMS device 1204.

The core network device 1203 is configured to send an SMS message to an SMS device. For the SMS device 1204, refer to the SMS device 1100 shown in FIG. 11.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instruction is loaded and executed on the computer, the procedure or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A relay device, comprising:
   a transmitter, configured to broadcast a first message, wherein the first message indicates that the relay device supports data forwarding;
   a receiver, configured to receive a second message from a remote device, wherein the second message comprises data of the remote device; and
   a processor, configured to send, based on the second message, the data to a core network device, and to send a non-access stratum (NAS) message to the core network device, wherein the NAS message comprises the data and relay indication information, and the relay indication information indicates that the data is forwarded data; or
   the second message comprises a short message service (SMS) message, and the SMS message comprises the data and an identity of the remote device; and the processor is further configured to: send a NAS message to the core network device, wherein the NAS message comprises the SMS message; or
   the second message further comprises the identity of the remote device; and the processor is further configured to: generate an SMS message, and send the SMS message to the core network device, wherein the SMS message comprises the data and the identity of the remote device.

2. The relay device according to claim 1, wherein the second message further comprises at least one of an authentication parameter or an identity of the remote device.

3. The relay device according to claim 2, wherein the second message further comprises the authentication parameter, and the processor is further configured to:
   perform authentication on the remote device based on the authentication parameter; and
   send the data to the core network device in response to the remote device being authenticated successfully.

4. A remote device, comprising:
   a receiver, configured to monitor a first message broadcast by a relay device, wherein the first message indicates that the relay device supports data forwarding; and
   a transmitter, configured to send a second message to the relay device, wherein the second message comprises data of the remote device,
   wherein the second message comprises a short message service (SMS) message, and the SMS message comprises the data and an identity of the remote device, wherein the second message is to cause a non-access stratum (NAS) message to be sent to a core network device, wherein the NAS message comprises the SMS message; or the second message further comprises the identity of the remote device, wherein the second message is to cause an SMS message to be generated and sent to the core network device, wherein the SMS message comprises the data and the identity of the remote device.

5. The remote device according to claim 4, wherein the second message further comprises at least one of an authentication parameter or an identity of the remote device.

6. A core network device, comprising:
a communications interface, configured to receive a non-access stratum (NAS) message from a relay device, wherein the NAS message comprises data of a remote device and relay indication information, and the relay indication information indicates that the data is forwarded data; and
a processor, configured to send the data based on the relay indication information,
wherein the communications interface is further configured to receive a second message that comprises a short message service (SMS) message, and the SMS message comprises the data and an identity of the remote device.

7. The core network device according to claim 6, wherein the relay indication information comprises a type of the data, and the processor is further configured to:
send the data to an application server (AS) corresponding to the type based on the type of the data.

8. The core network device according to claim 6, wherein the processor is further configured to:
send the data to a connection management platform in response to the relay indication information indicating that the data is the forwarded data.

* * * * *